(12) United States Patent
Wagener

(10) Patent No.: US 9,954,636 B2
(45) Date of Patent: Apr. 24, 2018

(54) COLORLESS, DIRECTIONLESS AND CONTENTIONLESS NETWORK NODE

(71) Applicant: NISTICA, INC., Bridgewater, NJ (US)

(72) Inventor: Jefferson L. Wagener, Morristown, NJ (US)

(73) Assignee: Nistica, Inc., Bridgewater, NJ (US)

(*) Notice: Subject to any disclaimer, the term of this patent is extended or adjusted under 35 U.S.C. 154(b) by 0 days.

(21) Appl. No.: 14/953,106

(22) Filed: Nov. 27, 2015

(65) Prior Publication Data

US 2016/0149664 A1     May 26, 2016

Related U.S. Application Data

(60) Provisional application No. 62/084,843, filed on Nov. 26, 2014.

(51) Int. Cl.
*H04B 10/00* (2013.01)
*H04J 14/02* (2006.01)
*H04Q 11/00* (2006.01)

(52) U.S. Cl.
CPC ...... *H04J 14/0212* (2013.01); *H04J 14/0213* (2013.01); *H04Q 11/0005* (2013.01); *H04Q 2011/0016* (2013.01); *H04Q 2011/0026* (2013.01)

(58) Field of Classification Search
USPC .................................................. 398/45–57
See application file for complete search history.

(56) References Cited

U.S. PATENT DOCUMENTS

| | | |
|---|---|---|
| 6,430,328 B1 | 8/2002 | Culver et al. |
| 6,721,473 B1 | 4/2004 | Islam |
| 6,847,479 B1 | 1/2005 | Islam |
| 6,882,771 B1 | 4/2005 | Islam |
| 6,956,687 B2 | 10/2005 | Moon et al. |
| 7,092,599 B2 | 8/2006 | Frisken |
| 7,116,862 B1 | 10/2006 | Islam |
| 7,123,833 B2 | 10/2006 | Szczepanek et al. |
| 7,126,740 B2 | 10/2006 | Szczepanek et al. |
| 7,339,714 B1 | 3/2008 | Islam |
| 7,397,980 B2 | 7/2008 | Frisken |
| 2011/0268442 A1 | 11/2011 | Boertjes et al. |
| 2012/0170930 A1* | 7/2012 | Komiya .............. G02B 6/3546 398/34 |
| 2012/0219293 A1* | 8/2012 | Boertjes ............. H04J 14/0204 398/48 |

(Continued)

FOREIGN PATENT DOCUMENTS

EP     2651059 A1    10/2013

*Primary Examiner* — Agustin Bello
(74) *Attorney, Agent, or Firm* — Stuart H. Mayer; Mayer & Williams PC

(57) ABSTRACT

A node that is colorless, directionless and contentionless includes an add/drop terminal having an add wavelength selective switch (WSS) and a drop WSS. The add and drop WSSs are each configured to selectively direct any subset of the wavelength components received at any of its inputs to a different one of its optical outputs, provided that the wavelength components of optical beams received by any two of the inputs cannot be simultaneously directed to a common one of the outputs. A plurality of transponder ports are each optically coupled to a different output of the drop WSS and a different input of the add WSS.

23 Claims, 9 Drawing Sheets

(56) References Cited

U.S. PATENT DOCUMENTS

| | | | |
|---|---|---|---|
| 2014/0126903 A1* | 5/2014 | Kaneoka | H04J 14/0205 |
| | | | 398/48 |
| 2014/0147121 A1 | 5/2014 | Matsukawa | |
| 2014/0294346 A1 | 10/2014 | Neilson et al. | |
| 2014/0341583 A1* | 11/2014 | Wu | G02B 6/29313 |
| | | | 398/85 |
| 2015/0098696 A1* | 4/2015 | Oi | H04J 14/0221 |
| | | | 398/38 |
| 2015/0117851 A1* | 4/2015 | Wellbrock | H04L 41/0816 |
| | | | 398/2 |
| 2015/0208146 A1* | 7/2015 | Younce | H04Q 11/0066 |
| | | | 398/21 |
| 2015/0256908 A1* | 9/2015 | Zhu | H04L 45/62 |
| | | | 398/85 |
| 2015/0280854 A1* | 10/2015 | Matsukawa | H04J 14/022 |
| | | | 398/3 |
| 2015/0288478 A1* | 10/2015 | Wellbrock | H04J 14/021 |
| | | | 398/83 |
| 2016/0036549 A1* | 2/2016 | Roorda | H04J 14/0212 |
| | | | 398/49 |
| 2016/0099851 A1* | 4/2016 | Archambault | H04J 14/0212 |
| | | | 398/16 |
| 2016/0149664 A1* | 5/2016 | Wagener | H04J 14/0212 |
| | | | 398/49 |

* cited by examiner

COLORLESS, DIRECTIONLESS AND CONTENTIONLESS NETWORK NODE

RELATED APPLICATION

This application is a non-provisional of U.S. Provisional Application No. 62/084,843, entitled "Modular Optical Systems for High-Speed and High-Degree of Connectivity", filed Nov. 26, 2014 and is related to U.S. patent application Ser. No. 14/709,770, filed May 12, 2015, entitled "Multipoint, Contentionless Wavelength Selective Switch (WSS) which is a non-provisional of U.S. Provisional Application Ser. No. 62/113,738, filed Feb. 9, 2014, the applications of which are incorporated herein by reference.

BACKGROUND

In an optical WDM transmission network, optical signals having a plurality of optical channels at individual wavelengths are transmitted from one location to another. An important element in WDM technology is a reconfigurable optical add/drop multiplexing (ROADM)-based node, which can take in signals at multiple wavelengths and selectively drop some of these wavelengths locally, while letting others pass through. Such capabilities provide the WDM network with flexibility and reconfigurability.

An ideal ROADM-based node has three important features, which are referred to colorless, directionless and contentionless. A colorless node is a node in which each add/drop port of the node is not wavelength selective; any wavelength can be added or dropped at any transponder port. A directionless node is node in which an add/drop channel at the node is not degree selective; any wavelength added on a transponder port can be directed to any outbound nodal degree, and vice versa. A contentionless node is a node in which the same wavelength can be added to or dropped from multiple degrees at the same time to any available transponder port.

SUMMARY

In one aspect, a network node includes a plurality of network degree interfaces that each direct WDM optical signals onto, and receive WDM optical signals from, a different optical transmission path of an optical transmission network. Each of the network degree interfaces is optically coupled to one another so that any one or more wavelength components of a WDM optical signal received on any one of the network degree interfaces is directable to any other of the network degree interfaces. The network node also includes an add/drop interface that includes a drop wavelength selective switch (WSS) and an add WSS. The drop WSS has a plurality of inputs each being optically coupled to receive wavelength components from a different one of the network degree interfaces and a plurality of outputs. The add WSS have a plurality of outputs each being optically coupled to direct wavelength components to a different one of the network degree interfaces and a plurality of inputs. The add and drop WSSs are each configured to selectively direct any subset of the wavelength components received at any of its inputs to a different one of its optical outputs, provided that the wavelength components of optical beams received by any two of the inputs cannot be simultaneously directed to a common one of the outputs. A plurality of transponder ports are each optically coupled to a different output of the drop WSS and a different input of the add WSS.

DETAILED DESCRIPTION

Colorless-directionless-contentionless (CDC) nodes can be difficult to achieve in practice, especially for nodes that employ a large number of transponder ports. A key component of a ROADM-based node is a wavelength selective switch (WSS). One reason for the difficulty in providing a CDC node is the lack of a practical wavelength selective switch (WSS) that is itself contentionless. CDC nodes that are implemented without the use of contentionless WDDs are generally complex and suffer from impairments such as high splitting losses when a large number of ports are employed. Accordingly, commonly available nodes are sometime both colorless and directionless, but not contentionless.

Figure 1:
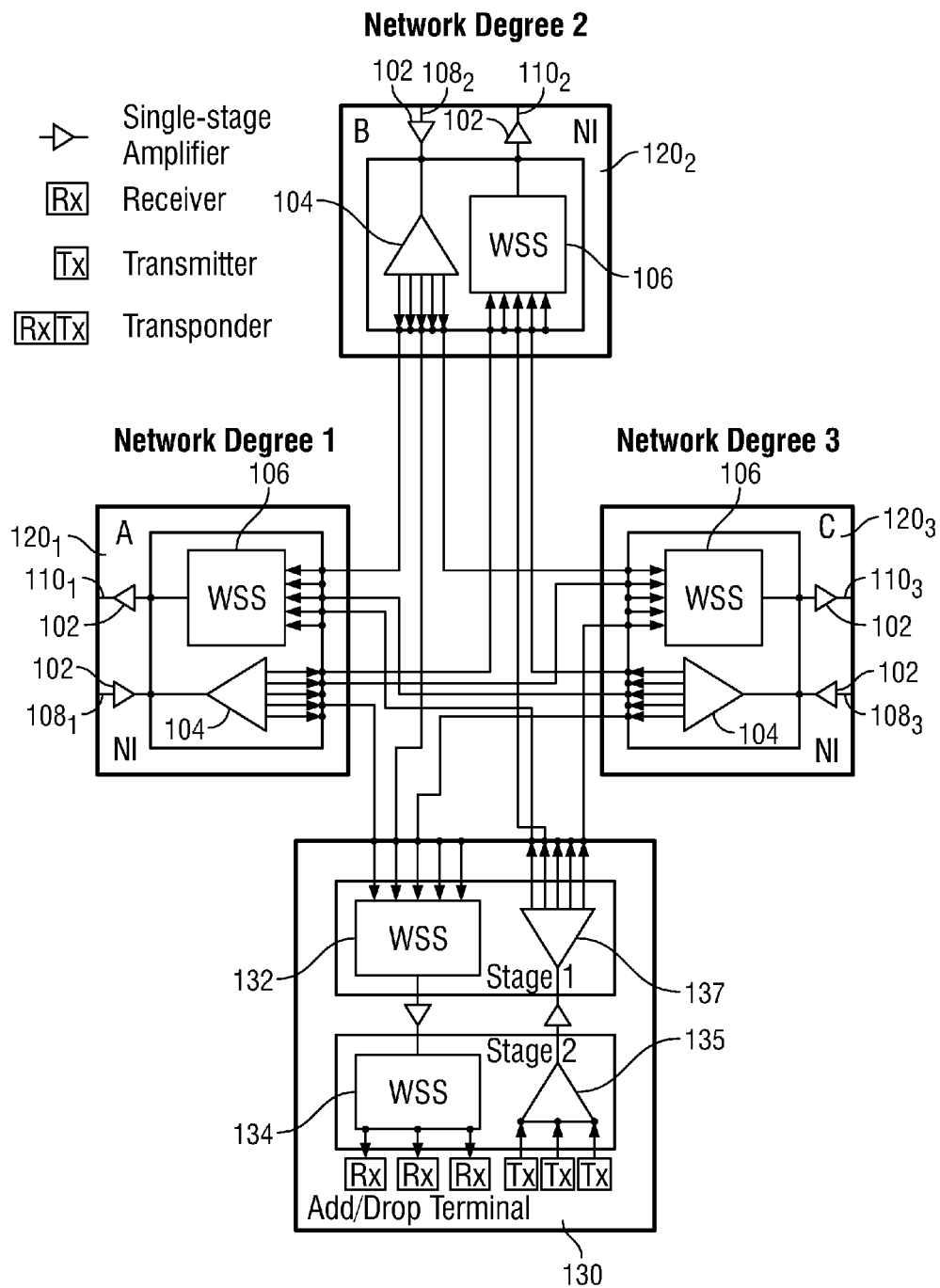
FIG. 1 is a schematic diagram of a conventional node architecture that is colorless and directionless but not contentionless.

FIG. 1 is a schematic diagram of a conventional node architecture that is colorless and directionless but not contentionless. The node 100 is a three degree node that includes network degree interfaces $120_1$, $120_2$ and $120_3$. Each network degree interface is coupled to a pair of optical amplifiers 102, with an input connected to a 1×N optical fan-in device, e.g., a power splitter (PS) or a 1×N wavelength selective switch (WSS) 104, and an output connected to a N×1 optical fan-out device, i.e., WSS 106. Multiplexed optical signals on input port $108_1$ from network degree 1 are selectively directed via PS/WSS 104 to WSSs 106 and associated output ports $110_2$, and/or $110_3$ for network degrees 2 and 3, respectively. In the same manner, multiplexed optical signals on input ports $108_2$ and $108_3$ (network degrees 2 and 3) may be similarly routed to the other network degrees of the system.

An add/drop terminal 130 is used to locally add and/or drop wavelengths. Each add/drop terminal has a drop portion that includes a pair of 1×N WSSs 132 and 134. The first WSS 132 is used to collect drop traffic from different directions and the second WSS 134 is used to select which wavelength is to be dropped to which transponder port. The add portion of the add/drop terminal includes a combiner 135 for aggregating the traffic from different transponders and a splitter 137 for directing the combined traffic to different directions. Because of the use of the first 1×N WSS 132 in the add/drop terminal 130, only one unique wavelength can be dropped at any given time. Thus, the node 100 suffers from contention.

Figure 2:
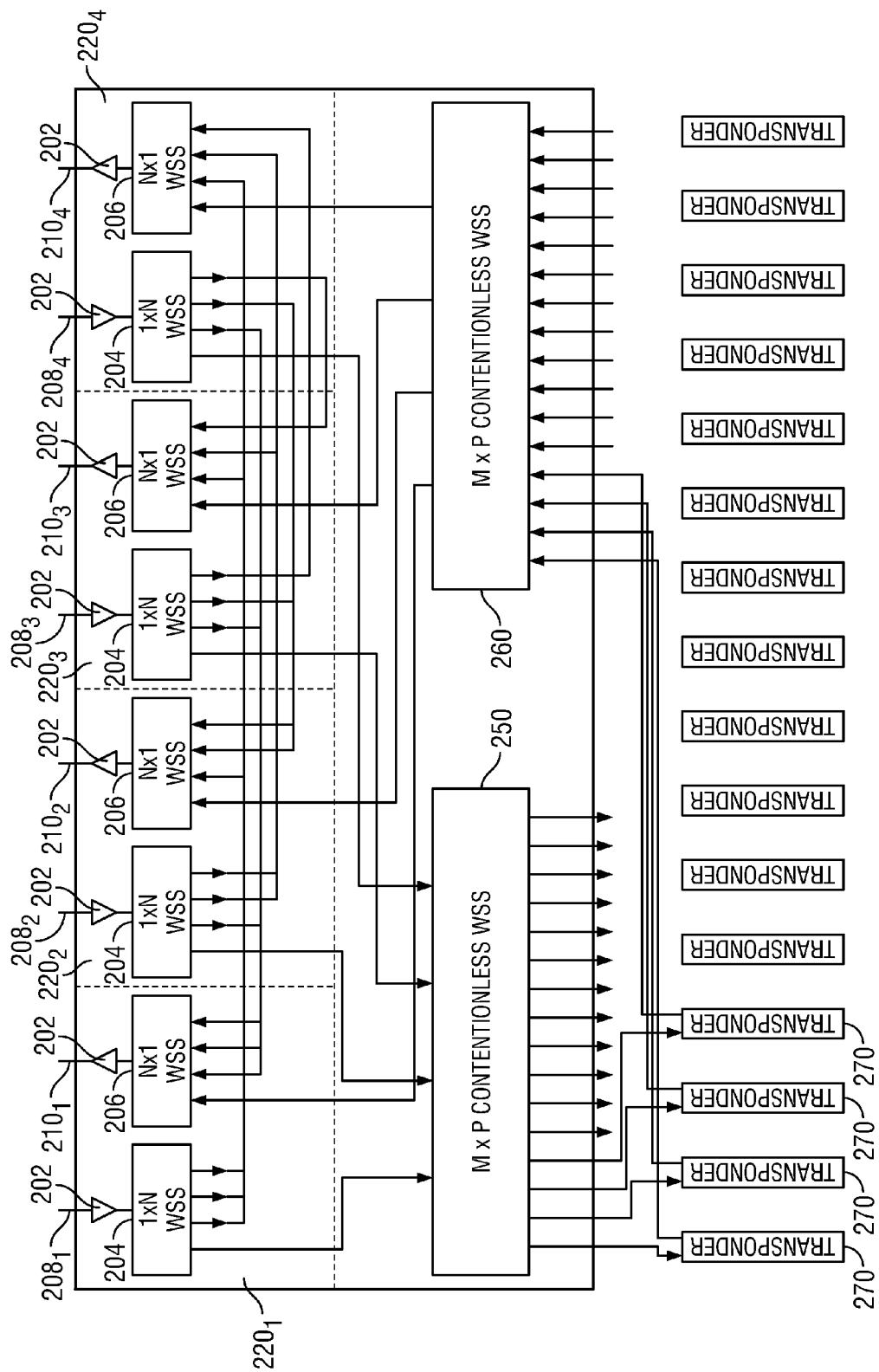
FIG. 2 shows one example of a node that is colorless, directionless and contentionless.

In one aspect, the subject matter disclosed herein relates to a node that is colorless, directionless and contentionless. This result is achieved, in one implementation, by using an add/drop terminal that includes a wavelength selective switch (WSS) whose operation is restricted in a manner that allows it to be implemented in a practical manner, yet nevertheless allows the node to operate contentionlessly. As shown in FIG. 2, the CDC node 200 is illustrated as a four degree node. Of course, more generally, the node 200 may be configured to have any desired number of degrees.

The CDC node 200 is a three degree node that includes network degree interfaces $220_1$, $220_2$ and $220_3$ and $220_4$. Each network degree interface is coupled to a pair of optical amplifiers 202, with an input connected to a 1×N optical fan-in device, e.g., a power splitter (PS) or a 1×N wavelength selective switch (WSS) 204, and an output connected to a N×1 optical fan-out device, e.g., N×1 WSS 206. Multiplexed optical signals on input port $208_1$ from network degree 1 are selectively directed via PS/WSS 204 to WSSs 206 and associated output ports $210_2$, $210_3$ and/or $210_4$ for network degrees 2, 3 and 4, respectively. In the same manner, multiplexed optical signals on input ports $208_2$, $208_3$ and $208_4$ (network degrees 2, 3 and 4) may be similarly routed to the other network degrees of the system. That is, as indicated logically in FIG. 2 by the lines connecting the input ports of WSSs 204 and the output ports of the WSSs 208, each of the network degree interfaces are optically coupled to one another so that any one or more wavelength components of a WDM optical signal received on any one of the network degree interfaces is directable to any other of the network degree interfaces.

The CDC node 220 also includes an add/drop interface to locally add and/or drop wavelengths. Each add/drop terminal has a drop portion that includes a first M×P WSS 250, where M is equal to the number of degrees in the node and P is the number of transponder ports available in the node. Each of the M input ports of the first M×P WSS 250 are optically connected to an output of the 1×N optical fan-in devices 204 and each of P output ports of the first M×P WSS 250 is connected to one of the transponders ports 270. Likewise, each add/drop terminal has an add portion that includes a second M×P WSS 260. Each of the M output ports of the second M×P WSS 260 is optically connected to an input of the optical fan-out device, i.e., N×1 WSS 206 and each of the P input ports of the second P×M WSS 260 is connected to one of the transponder ports 270. For simplicity, the first and second WSSs 250 and 260 are only shown being optically coupled to 4 of the transponders.

As previously mentioned, the operation of the M×P WSSs 250 and 260 is restricted in such a way that allows them to be implemented in a practical, relatively simple manner that does not adversely impact the operation of the CDC node. In particular, each of the M×P WSSs 250 and 260 is configured to be able to selectively direct any subset of the wavelength components of each of the WDM optical signals received at any of its input ports to a different one of its optical output ports, provided that the wavelength components of an optical beams received by any two of the input ports cannot be simultaneously directed to a common one of the output ports. While a WSS operating in accordance with this restriction still allows the node to be contentionless, such a WSS can be less complex and simpler to manufacturer and therefore less expensive than a WSS that does not operate in accordance with this restriction.

One example of a suitable WSS that may be employed for one or both of the WSSs 250 and 260 used in the add/drop terminal of CDC node 200 is shown in co-pending U.S. Pat. Appl. No. 14/709,770, which is hereby incorporated by reference in its entirety. This exemplary WSS will be illustrated below with reference to FIGS. 3-9. Of course, the CDC node disclosed herein may employ other WSSs that operate in accordance with the aforementioned restriction on their functionality. Moreover, in some embodiments the WSSs 250 and 260 may even function in a more restrictive manner. Specifically, an additional restriction may be imposed in which only one individual wavelength component can be directed to any given output at any given time.

Figure 3A:
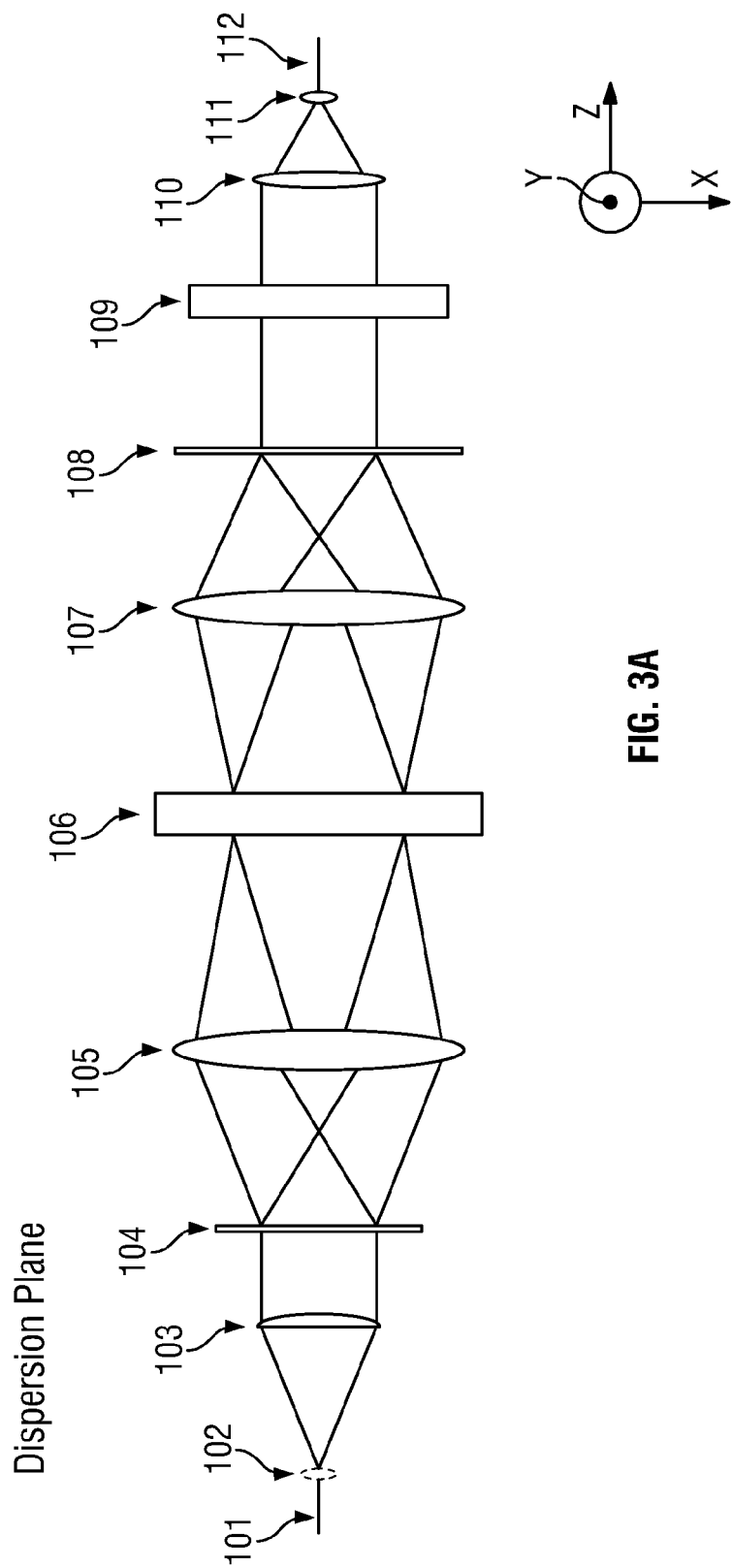
FIGS. 3A and 3B are top and side views respectively, of one example of a simplified optical device such as a multipoint contentionless wavelength selective switch.
Figure 3B:
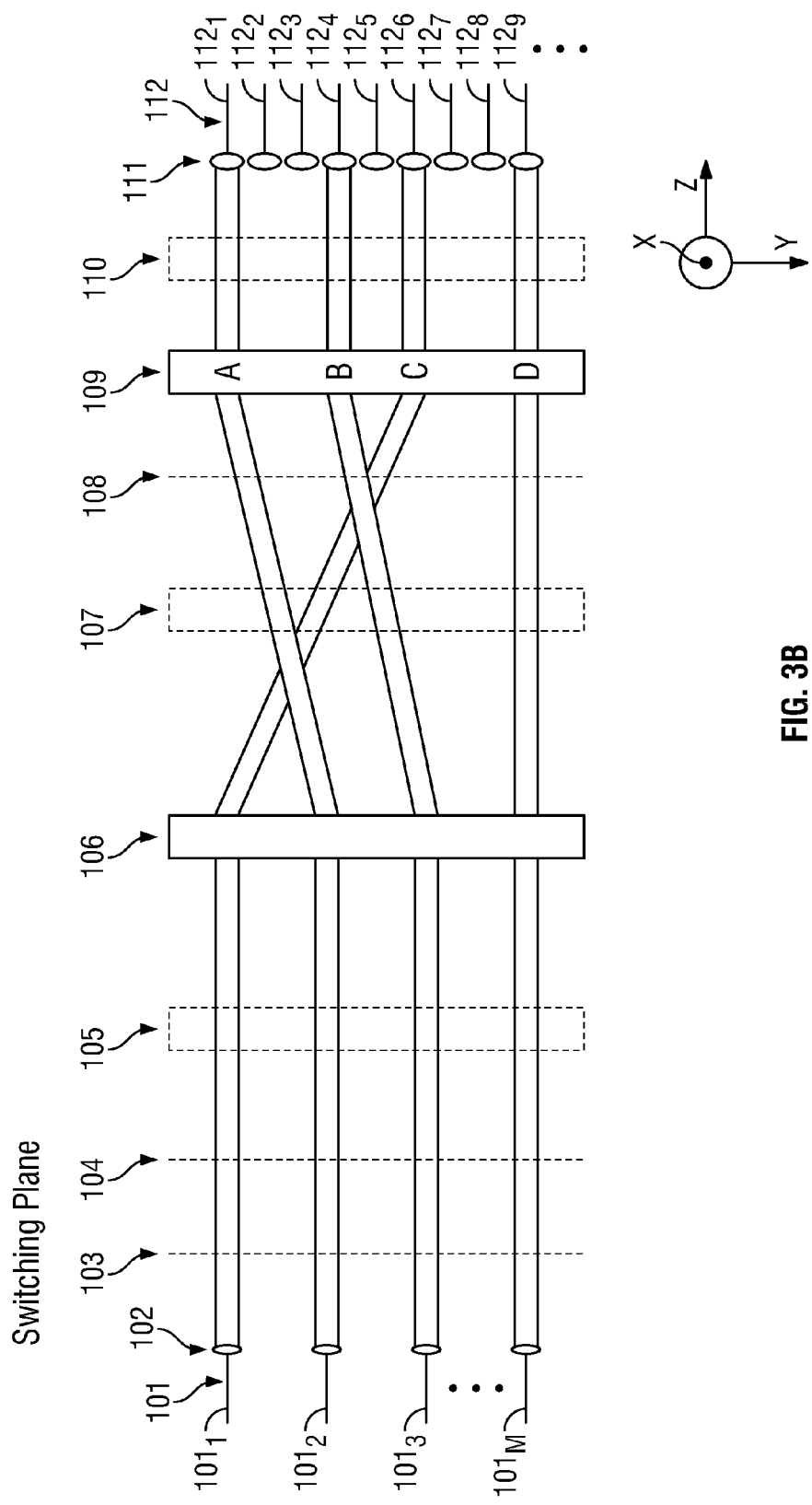

FIGS. 3A and 3B are top and side views respectively, of WSS 100. The top view of FIG. 3A is also referred to herein as the dispersion plane view and the side view of FIG. 3B is also referred to herein as the switching plane view. Light is input and output to the WSS 100 through optical waveguides such as optical fibers which serve as input and output ports. As best seen in FIG. 3B, an input port array 101 may comprise a plurality of individual input fibers $101_1$, $101_2$, $101_3$ ... $101_m$ respectively coupled to collimators $102_1$, $102_2$ $102_3$ ... $102_m$. Light from one or more of the input fibers 101 is converted to a free-space beam by the collimators 102. The light exiting from input port array 101 is parallel to the z-axis. While the input port array 101 only shows four optical fiber/collimator pairs in FIG. 1B, more generally any suitable number of optical fiber/collimator pairs may be employed.

In FIGS. 3A and 3B, optical elements which affect the light in two axes are illustrated with solid lines as bi-convex optics in both views. On the other hand, optical elements which only affect the light in one axis are illustrated with solid lines in the axis that is affected. The optical elements which only affect light in one axis are also illustrated by dashed lines in the axis which they do not affect. For instance, in FIGS. 3A and 3B the optical elements 102, 106, 109 and 111 are depicted with solid lines in both figures. On the other hand, optical elements 103, 104, 105, 107 and 110 are depicted with solid lines in FIG. 3A (since they have focusing power in the dispersion plane) and with dashed lines in FIG. 3B (since they leave the beams unaffected in the switching plane). Optical element 108 is depicted with solid lines in FIG. 3B (since it affects the beams in the switching plane) and with dashed lines in FIG. 3A (since it leaves the beams unaffected in the dispersion plane).

The beams exiting the input port array 101 are directed to the collimators 102, which are cylinder lenses that collimate the beams along one axis in the switching plane and allow the beams to continue diverging in the dispersion plane. A cylinder lens 103 receives the beams from the collimators 102 and collimates the beams in the dispersion plane. The lens 103 has no significant effect on the beams in the switching plane. The beams are now collimated in both dispersion plane and the switching plane.

After being collimated in the dispersion plane by the cylinder lens 103, the beams are directed to a first wavelength dispersion element 104 (e.g., a diffraction grating or prism), which separates the free space light beams into their constituent wavelength components (or simply "wavelengths") or channels in the dispersion plane. Due to the configuration of the first wavelength dispersion element 104 (e.g., the orientation of the grating), it has no significant effect on the beams in the switching plane. The dispersed wavelengths are then directed to a cylinder lens 105, which focuses the wavelengths in the dispersion plane onto a first transmissive switching element 106. The cylinder lens 105 leaves the wavelengths largely unaffected in the switching plane.

Figure 4:
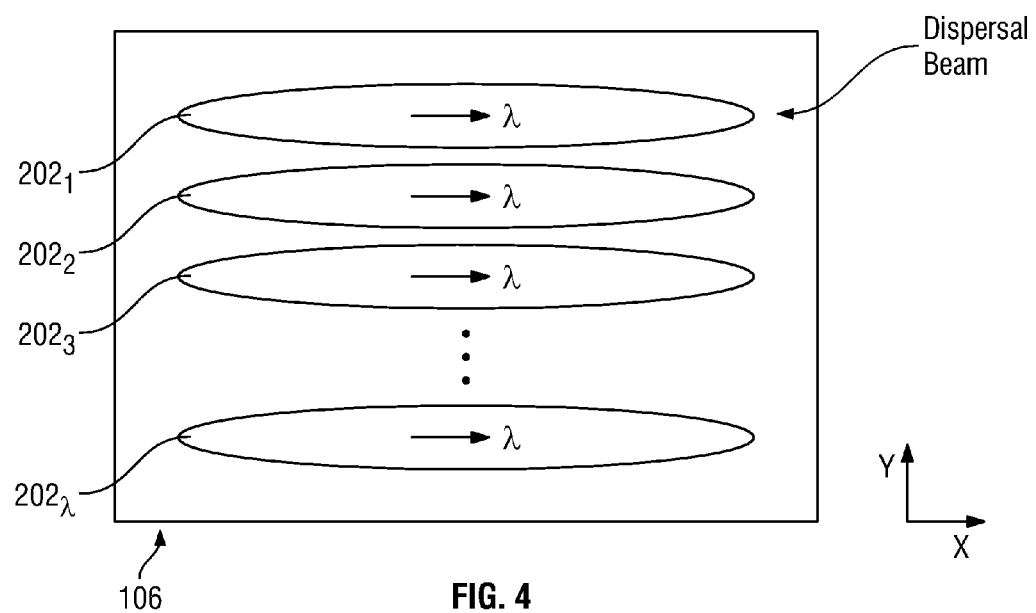
FIG. 4 is a plan view of the first switching element employed in the wavelength selective switch of FIGS. 3A and 3B onto which the input beams are imaged.

At this point, the input beams are spatially separated from one another, but each is dispersed on the switching element 106. This is illustrated in FIG. 4, which is a plan view, also known as an optical footprint view, of the first switching element 106 on which the input beams are imaged. Each one of the inputs beams $202_1, 202_2, 202_3 \ldots 202_m$ is received from one of the fibers $101_1, 101_2, 101_3 \ldots 101_m$ in the input array 101. As shown, any specific input beam $202_1, 202_2, 202_3 \ldots 202_n$ is dispersed into its constituent wavelength components along the x-axis and spatially separated from the other input beams along the y-axis.

The first switching element 106 then steers the input beams in a wavelength dependent manner in the switching plane. The switching by the first switching element is performed in coordination with a second switching element 109. The manner in which this switching is performed will be explained below after specifying the remaining optical elements in the example of the optical device shown in FIGS. 3A and 3B.

After being steered by the first switching element 106, some or all of the constituent wavelengths components of each of the input beams are re-collimated in the dispersion plane by a cylinder lens 107. A second wavelength dispersion element 108 (e.g., a diffraction grating or prism), is then used to combine or un-disperse the collimated, constituent components of the beams in the dispersion plane. Cylinder lens 107 and second wavelength dispersion element 108 have no significant effect in the switching plane.

Figure 5:
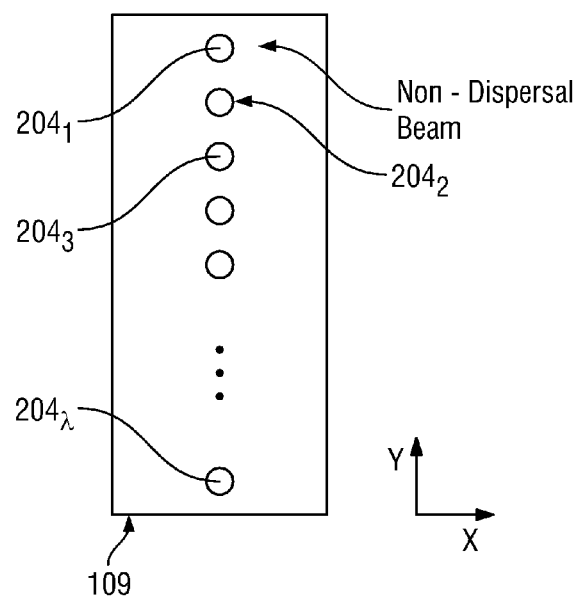
FIG. 5 is a plan view of the second switching element employed in the wavelength selective switch of FIGS. 3A and 3B onto which non-dispersed optical beams are imaged.

A second switching element 109 receives the recombined beams from the dispersion element 108. The location at which each of the beams is received on the second switching element 109 is determined by the switching performed by the first switching element 106. Specifically, the recombined beams are each selectively directed to one of the locations A, B, C, ... shown in FIG. 3B. FIG. 5 shows the beams $204_1, 204_2, 204_3 \ldots 204_n$ arriving on the second switching element 109 at the various locations A, B, C ..., which although not dispersed, are physically separated from the other input beams $204_1, 204_2, 204_3 \ldots 204_n$ on the second switching element 109

Cylinder lens 110, cylinder lenslet array 111 and fiber array 112 form the output optical couplings in a similar way to the input optics 101,102 and 103. In particular, the cylinder lens 110 collimates the beams in the switching plane and directs the beams to respective ones of the cylinder lenses $111_1, 111_2, 111_3, \ldots 111_n$ in the cylinder lenslet array 111. Each cylinder lens $111_1, 111_2, 111_3, \ldots 111_n$ directs its respective beam to a corresponding one of the output ports $112_1, 112_2, 111_3 \ldots 112_n$ in the output fiber port array 112.

As shown in FIG. 3B, there is a one-to-one relationship between the locations A, B, C . . . on the second switching element 109 and the output ports $112_1, 112_2, 112_3 \ldots 112_n$. That is, any subset of recombined wavelengths in each beam that is directed from any of the input ports to say, location A on the second switching element 109 will always be directed by the second switching element 109 to the same predefined one of the output ports. More generally, any subset of recombined wavelengths in each beam that is directed by any of the input ports to any particular location A, B, C . . . on the second switching element 109 will always be directed by the second switching element 109 to the same predefined one of the output ports corresponding to the particular location A, B, C . . . on the second switching element 109.

In operation, first and second switching elements 106 and 109 cooperate so that any subset of wavelengths of an optical beam received by any given input port 101 may be routed to any given output port 112, provided that any given output port can only accept a subset of wavelengths from a single input port at any one time. That is, switching elements 106 and 109 are arranged so that the output ports are restricted in that they only support a connection to one input at any given time, not multiple inputs at the same time. This switching behavior will be illustrated with reference to FIGS. 6 and 7.

Figure 6:
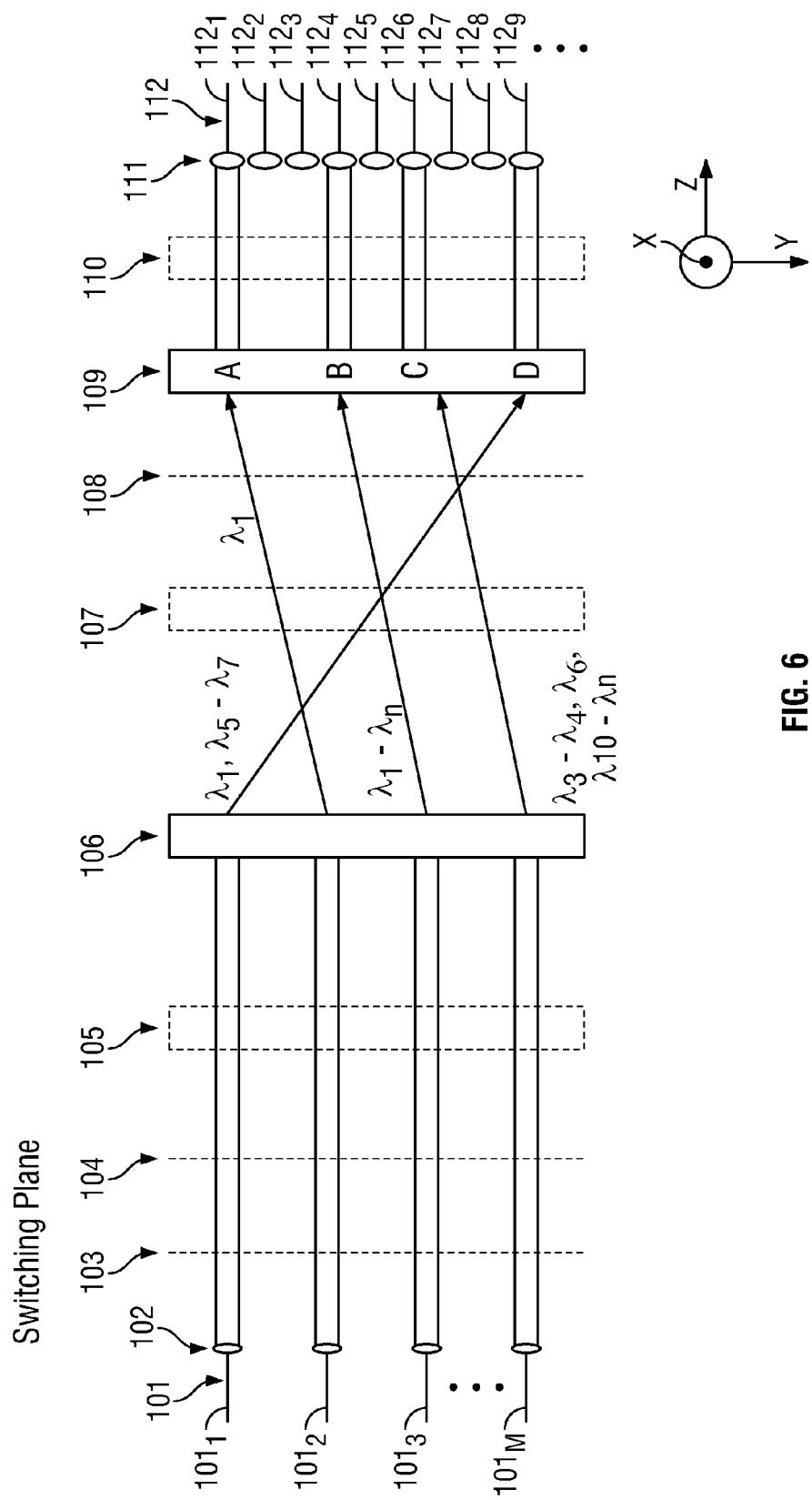
FIG. 6 is a side view of the optical device of FIGS. 3A and 3B showing various subsets of wavelengths that are received on the input ports being directed to various ones of the output ports.
Figure 7:
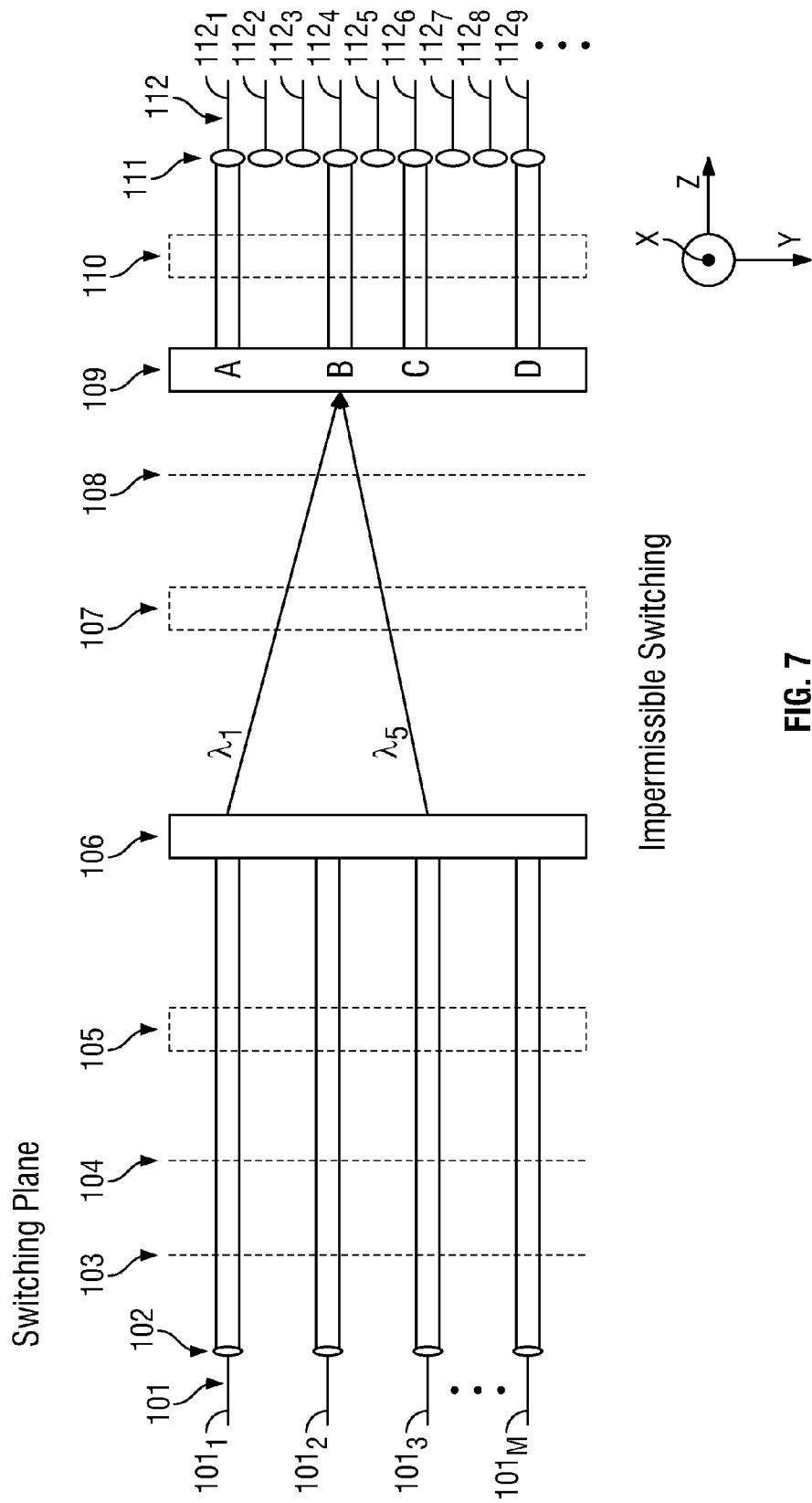
FIG. 7 is a side view of the optical device of FIGS. 3A and 3B illustrating a manner of switching two wavelengths components which the switching arrangement is incapable of performing.

FIG. 6 shows various subsets of wavelengths that are received on the input ports 101 being directed to various ones of the output ports. Each input port receives a WDM optical beam that includes wavelength components $\lambda_1$-$\lambda_n$. For example, in FIG. 6 the wavelength components $\lambda_1$ and $\lambda_5$-$\lambda_7$ of the optical beam received by input port $101_1$ are directed to output port $112_9$, the wavelength component $\lambda_1$ of the optical beam received by input port $101_2$ is directed to output port $112_1$, the wavelength components $\lambda_1$-$\lambda_n$ of the optical beam received by input port $101_3$ are directed to output port $112_5$ and the wavelength components $\lambda_3$-$\lambda_4$, $\lambda_6$ and $\lambda_{10}$-$\lambda_n$ of the optical beam received by input port $101_n$ are directed to output port $112_7$.

In contrast to FIG. 6, FIG. 67 shows a hypothetical and impermissible situation in which wavelength components are routed from the first switching element 106 to the second switching element 109. Specifically, the switching behavior shown in FIG. 6 is impermissible because it shows location D on the second switching element 109 simultaneously receiving wavelength components from both input port 1011 and input port $101_3$.

The first and second switching elements 106 and 109 may be based on any of a variety of different technology platforms. For example, the first and second switching elements may be beam-steering elements such as programmable optical phase modulators or micro-electromechanical (MEMS) based devices, for instance. One example of a suitable programmable optical phase modulator is a liquid crystal on silicon (LCoS) device. One example of a MEMs-based device is a digital micromirror device (DMD). In some embodiments both the first and second switching elements 106 and 109 are based on the same technology platform or different technology platforms. For instance, in the latter case the first switching element 106 may be a programmable optical phase modulator and the second switching element 109 may be a MEMs-based device.

Figure 8:
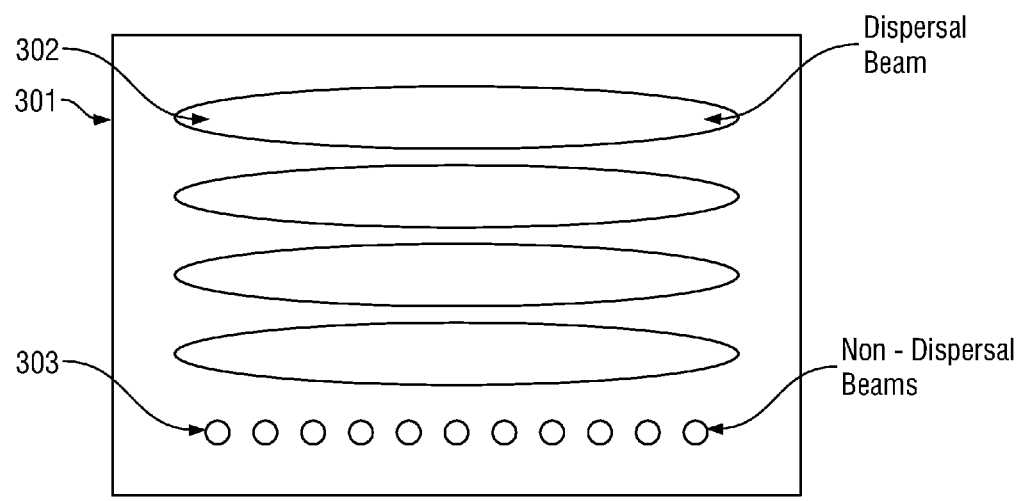
FIG. 8 is a plan view of the switching element employed in an alternative embodiment of the wavelength selective switch in which only a single switching element is employed.

In one alternative implementation, a single switching element is employed instead of the two switching elements shown in FIGS. 3-7. That is, the functions of both the first and second switching elements shown in FIGS. 3-7 are accomplished with one physical switching element. FIG. 8 shows an optical footprint view of such a combined switching element 301. The dispersed beams 302 and the non-dispersed beams 303 are physically separated and could be oriented or laid out in multiple ways. For example, although both the dispersed beams 302 and the non-dispersed beams 303 extend in the horizontal direction in FIG. 5, in other embodiments they may extend in different directions from one another (e.g., the dispersed beams 302 may extend in the horizontal direction and the non-dispersed beams 303 may extend in the vertical direction).

Figure 9:
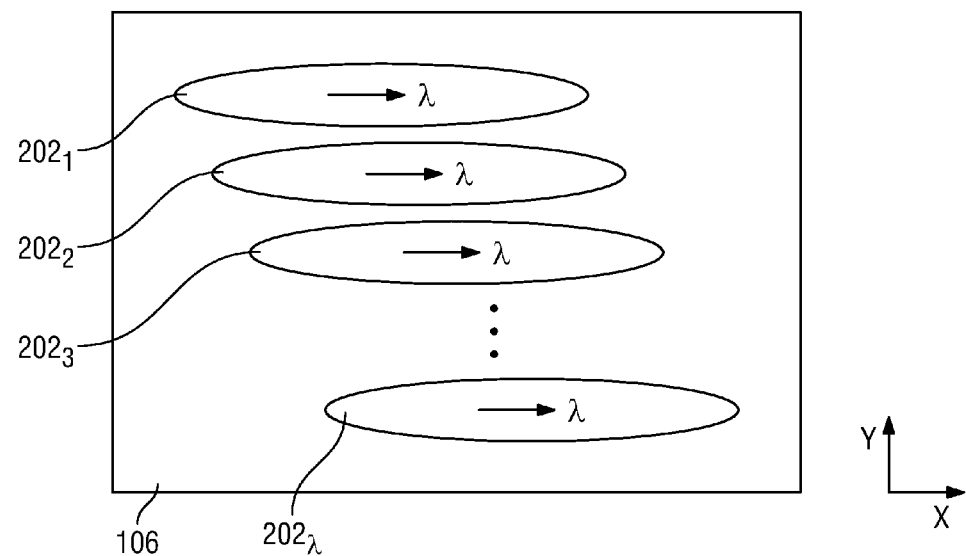
FIG. 9 is a plan view of the first switching element employed in an alternative embodiment of the wavelength selective switch of FIGS. 3A and 3B.

In another alternative implementation, crosstalk may be reduced by orienting the input ports so that that the spatially separated input beams are imaged onto the switching element 106 so that the input beams are misaligned with respect to one another. This is shown in FIG. 9, which is plan view of the switching element 106 similar to the plan view of FIG. 4. In FIG. 9, however, the input beams are staggered along the x-axis so that the same wavelengths in any two different input beams are not aligned along the y-axis.

It should be noted that the WSS described herein with reference to FIGS. 3-9 may operate in a reciprocal manner such that the input ports may serve as output ports and the output ports may serve as input ports. Accordingly, the terms input and output are used interchangeably with respect to the description of this device.

Figure 10:
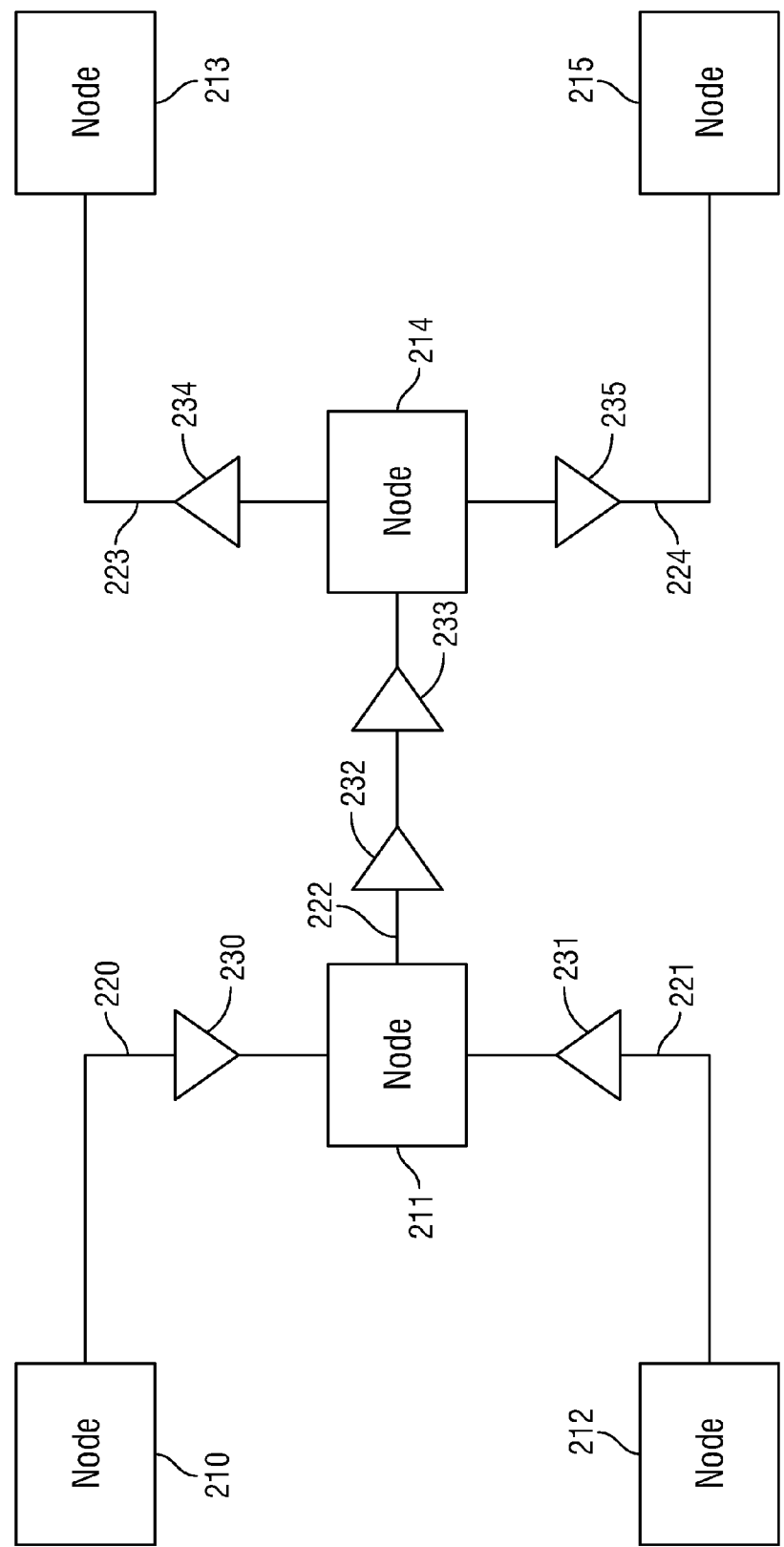
FIG. 10 shows one example of a WDM transmission network that may incorporate one or more CDC nodes of the type described herein.

FIG. 10 shows one example of a WDM transmission network 200 that may incorporate one or more CDC nodes of the type described herein. WDM transmission network 200 includes network nodes 210-215. Each node is connected to at least one other node by optical links 220-224, which may comprise optical fibers through which the WDM signals propagate. For example, node 210 is connected to node 211 by link 220, and node 211 is connected to node 212 by link 221. In addition, node 211 is connected to node 214 by link 222, and node 214 is connected to node 213 by link 223. Further, node 214 is connected to node 215 by link 224. In this example nodes 211 and 214 are three degree nodes. Each link may include one or more optical amplifiers 230-235 for amplifying the WDM signals. For example, links 220, 221, 223 and 224 respectively include optical amplifiers 230, 231, 234 and 235. Likewise, link 222 includes optical amplifiers 232 and 233. Information is transmitted and received over WDM transmission network 200 by modulation of one or more optical wavelengths to encode data onto the wavelengths. The various modulated optical wavelengths are combined into a single WDM signal that is transmitted over transmission links.

WDM transmission network may comprise a point-to-point optical network with terminal nodes, a ring optical network, a mesh optical network, or any other suitable optical network or combination of optical networks. The number of nodes and optical links shown in FIG. 2 is exemplary and provided for simplicity of illustration.

Optical amplifiers 230-235 may be any suitable type of all-optical amplifier (i.e, an amplifier without any optical to electrical conversion). For example, optical amplifiers may be rare-earth doped optical amplifiers such as erbium doped optical amplifiers or Raman optical amplifiers. The optical amplifiers employed in any given transmission network may all be of the same type or different types.

The invention claimed is:

1. A network node, comprising:
a plurality of network degree interfaces that each direct WDM optical signals onto, and receive WDM optical signals from, a different optical transmission path of a optical transmission network, each of the network degree interfaces being optically coupled to one another so that any one or more wavelength components of a WDM optical signal received on any one of the network degree interfaces is directable to any other of the network degree interfaces;

an add/drop interface that includes a drop wavelength selective switch (WSS) and an add WSS, the drop WSS having a plurality of inputs each being optically coupled to receive wavelength components from a different one of the network degree interfaces and a plurality of outputs, the add WSS having a plurality of outputs each being optically coupled to direct wavelength components to a different one of the network degree interfaces and a plurality of inputs, wherein the add and drop WSSs are each configured to selectively direct any subset of the wavelength components received at any of its inputs to a different one of its optical outputs, provided that the wavelength components of optical beams received by any two of the inputs cannot be simultaneously directed to a common one of the outputs, wherein at least one of the add or drop WSSs comprises a wavelength dispersion element for spatially separating optical beams into a plurality of wavelengths components and a switching arrangement for receiving the plurality of wavelength components of the optical beams and selectively directing the wavelength components between the inputs and the outputs, the switching arrangement including at least one optical beam steering arrangement having a first region onto which the spatially separated wavelength components are directed and a second region onto which each of the selectively directed subset of wavelength components are directed after the wavelength components in each of the subsets are spatially recombined with one another; and a plurality of transponder ports each being optically coupled to a different output of the drop WSS and a different input of the add WSS.

2. The network node of claim 1 wherein the add and drop WSSs are each further configured to selectively direct only a single one of the wavelength components to any given one of the outputs at any given time.

3. The network node of claim 1, wherein the at least one optical beam steering arrangement includes a single optical beam steering arrangement on which the first and second regions are located.

4. The network node of claim 1, wherein the optical beam steering arrangement includes first and second optical beam steering arrangements, the first region being located on the first optical beam steering arrangement and the second region being located on the second optical beam steering arrangement.

5. The network node of claim 1, wherein the at least one optical beam steering arrangement includes a programmable optical phase modulator.

6. The network node of claim 4, wherein the first and second optical beam steering arrangements include first and second programmable optical phase modulators.

7. The network node of claim 4, wherein the first and second optical beam steering arrangements include a programmable optical phase modulator and a MEMs-based device.

8. The network node of claim 4, wherein the first optical beam steering arrangement is programmable optical phase modulator and the second optical beam steering arrangement is a MEMs-based device.

9. The network node of claim 1, wherein the switching arrangement is configured to switch selected ones of the wavelength components while they are dispersed into spatially separated wavelength components and also when they are non-dispersed.

10. An optical transmission network comprising:
a plurality of network nodes;
a plurality optical transmission paths optically coupling each of the network nodes to at least one of the other network nodes, wherein at least one of the network nodes includes:
a plurality of network degree interfaces that each direct WDM optical signals onto, and receive WDM optical signals from, a different optical transmission path of the optical transmission network, each of the network degree interfaces being optically coupled to one another so that any one or more wavelength components of a WDM optical signal received on any one of the network degree interfaces is directable to any other of the network degree interfaces;
an add/drop interface that includes a drop wavelength selective switch (WSS) and an add WSS, the drop WSS having a plurality of inputs each being optically coupled to receive wavelength components from a different one of the network degree interfaces and a plurality of outputs, the add WSS having a plurality of outputs each being optically coupled to direct wavelength components to a different one of the network degree interfaces and a plurality of inputs, wherein the add and drop WSSs each include:
a wavelength dispersion arrangement for receiving optical beams from the inputs and spatially separating each of the optical beams into a plurality of wavelengths components; and
at least one optical beam steering arrangement having a first region onto which the spatially separated wavelength components are directed and a second region onto which any subset of the plurality of wavelength components of each of the optical beams is selectively directed after the wavelength components in each of the subsets are spatially recombined with one another, the at least one optical beam steering arrangement selectively directing each of the subsets of the plurality of wavelength components to a different one of the outputs;
a plurality of transponder ports each being optically coupled to a different output of the drop WSS and a different input of the add WSS.

11. The optical transmission network of claim 10, wherein the at least one optical beam steering arrangement includes a single programmable optical phase modulator on which the first and second regions are located.

12. The optical transmission network of claim 10, wherein the at least optical beam steering arrangement includes first and second programmable optical phase modulators, the first region being located on the first programmable optical phase modulator and the second region being located on the second programmable optical phase modulator.

13. The optical transmission network of claim 10, wherein the second region includes a plurality of locations on which the spatially recombined subsets of wavelength components are selectively directable by the at least one optical beam steering arrangement, each of the locations being associated with a different one of the outputs such that any of the subsets that are directed to a given one of the locations is received by the output associated with the given location.

14. The optical transmission network of claim 10, wherein the at least optical beam steering arrangement includes a programmable optical phase modulator and a MEMs-based device, the first region being located on the programmable optical phase modulator and the second region being located on the MEMs based device.

15. A network node, comprising:
a plurality of network degree interfaces that each direct WDM optical signals onto, and receive WDM optical signals from, a different optical transmission path of a optical transmission network, each of the network degree interfaces being optically coupled to one another so that any one or more wavelength components of a WDM optical signal received on any one of the network degree interfaces is directable to any other of the network degree interfaces;
an add/drop interface that includes a drop wavelength selective switch (WSS) and an add WSS, the drop WSS having a plurality of inputs each being optically coupled to receive wavelength components from a different one of the network degree interfaces and a plurality of outputs, the add WSS having a plurality of outputs each being optically coupled to direct wavelength components to a different one of the network degree interfaces and a plurality of inputs, wherein the add and drop WSSs are each configured to selectively direct any subset of the wavelength components received at any of its inputs to a different one of its optical outputs, wherein at least one of the add or drop WSSs comprises a wavelength dispersion element for spatially separating optical beams into a plurality of wavelengths components and a switching arrangement for receiving the plurality of wavelength components of the optical beams and selectively directing the wavelength components between the inputs and the outputs, the switching arrangement including at least one optical beam steering arrangement having a first region onto which the spatially separated wavelength components are directed and a second region onto which each of the selectively directed subset of wavelength components are directed after the wavelength components in each of the subsets are spatially recombined with one another; and
a plurality of transponder ports each being optically coupled to a different output of the drop WSS and a different input of the add WSS.

16. The network node of claim 15 wherein the add and drop WSSs are each further configured to selectively direct only a single one of the wavelength components to any given one of the outputs at any given time.

17. The network node of claim 15, wherein the at least one optical beam steering arrangement includes a single optical beam steering arrangement on which the first and second regions are located.

18. The network node of claim 15, wherein the optical beam steering arrangement includes first and second optical beam steering arrangements, the first region being located on the first optical beam steering arrangement and the second region being located on the second optical beam steering arrangement.

19. The network node of claim 15, wherein the at least one optical beam steering arrangement includes a programmable optical phase modulator.

20. The network node of claim 18, wherein the first and second optical beam steering arrangements include first and second programmable optical phase modulators.

21. The network node of claim 18, wherein the first and second optical beam steering arrangements include a programmable optical phase modulator and a MEMs-based device.

22. The network node of claim 18, wherein the first optical beam steering arrangement is programmable optical phase modulator and the second optical beam steering arrangement is a MEMs-based device.

23. The network node of claim 15, wherein the switching arrangement is configured to switch selected ones of the wavelength components while they are dispersed into spatially separated wavelength components and also when they are non-dispersed.

\* \* \* \* \*